Dec. 23, 1958  E. F. BRILL  2,865,298
CENTRIFUGAL PUMP
Filed Aug. 15, 1956
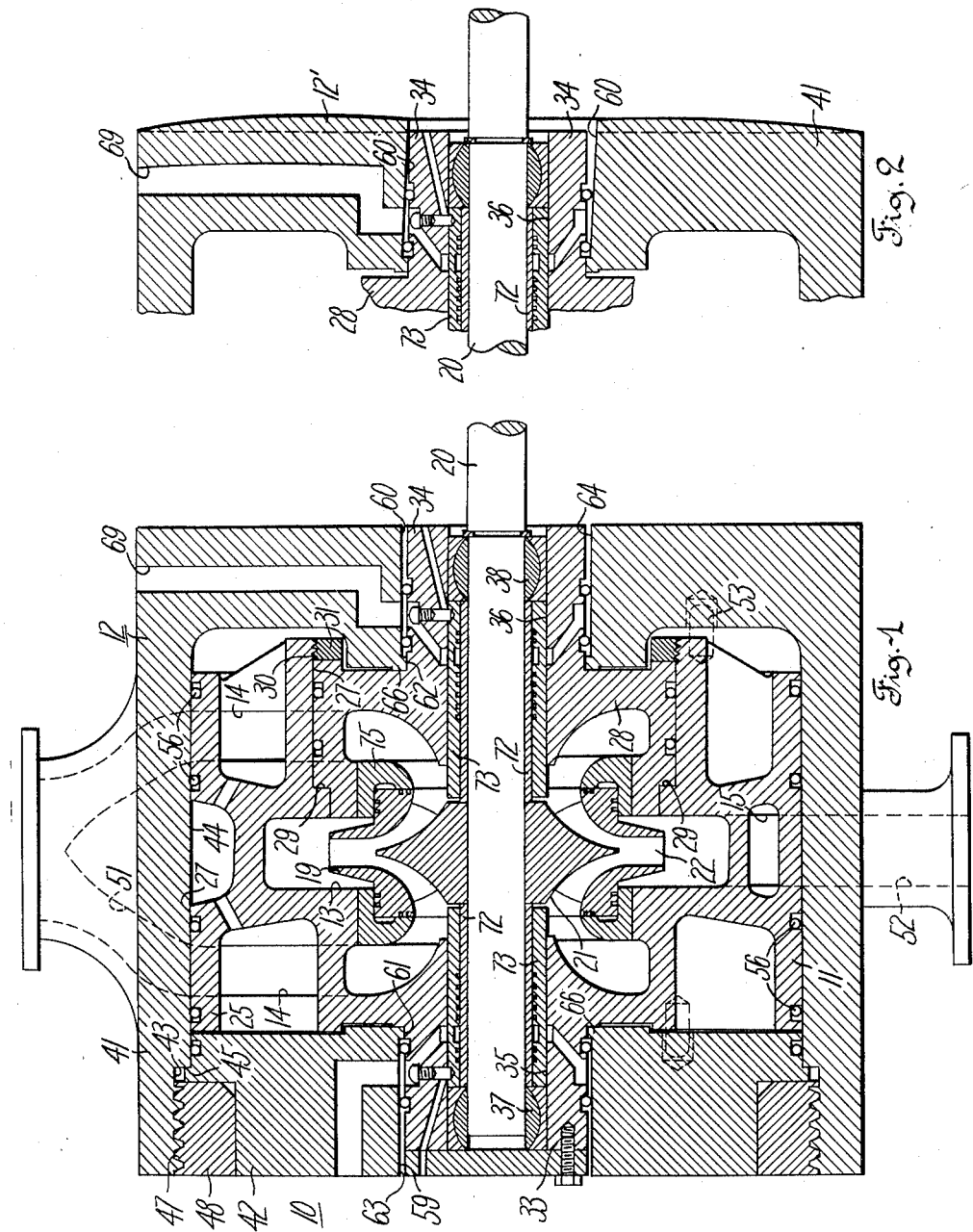
Inventor
Edward F. Brill
By Robert B. Benson
Attorney United States Patent Office 2,865,298
Patented Dec. 23, 1958

2,865,298

CENTRIFUGAL PUMP

Edward F. Brill, Brookfield, Wis., assignor to Allis-Chalmers Manufacturing Company, Milwaukee, Wis.

Application August 15, 1956, Serial No. 604,165

4 Claims. (Cl. 103—104)

This invention relates generally to single stage centrifugal pumps. More specifically this invention relates to a high pressure high speed centrifugal pump having a casing that will deflect under high pressures generated within the pump without transmitting damaging forces to the internal parts of the pump particularly the bearings and the shaft.

Centrifugal pumps which generate high pressures are generally constructed with a separate inner and outer casing. The inner casing surrounds the impeller and the outer casing completely encloses the inner casing and is positioned thereon. Bearings for the pump are mounted in the inner casing and the shaft is journaled in the bearings. The inner casing of such a pump is subjected to the discharge pressure on its outer side to put the casing in compression. The outer casing is subjected to the high discharge pressure of the pump on its inner side and to atmospheric pressure on its outer side. The pressure differential on the outer casing has a tendency to deflect the outer casing. If the outer casing is restrained and not permitted to deflect under the pressure generated within the pump, it will exert a force on the point at which it is being restrained and in this case the restraining point would be the inner casing. Such a force exerted on the inner casing is in turn transmitted to the bearings and the shaft. This undue force on the bearings causes binding between the bearings and the shaft thereby reducing the life of the bearing and causing excessive wear on the shaft. Furthermore, the force transmitting through the inner casing to the shaft has a tendency to bend the shaft thereby setting up undesirable bending stresses within the shaft.

Centrifugal pumps which develop relatively high pressure can be equipped with casings which are large enough and strong enough to contain the high pressures generated within the pump without any damaging deflection of the casing. However, the cost and size of such a pump would be prohibitive. Therefore, pump manufacturers are faced with the problem of developing a pump casing which will withstand the relatively high pressures generated within the pump without transmitting undue forces to the bearings and the shaft.

This invention deals with the above problem by calling for a high pressure centrifugal pump having an outer casing which will deflect due to the internal pressure generated within the pump and will not exert undue pressure on the inner casing, bearings, and the shaft. It is contemplated that the pump have an outer casing and an inner casing and that the outer casing be in contact with the inner casing at only two points. The points of contact are axially spaced inwardly from the ends of the pump. In such a pump, the outer casing deflects in response to the internal pressure in the pump and pivots freely around its points of contact on the inner casing. Since the outer casing pivots freely around its points of contact on the inner casing, no undue pressure is exerted on the inner casing which can be transmitted to the bearings and the shaft. Hence, binding between the shaft and the bearings and undue bending stresses in the shaft are eliminated.

Therefore, it is the object of this invention to provide a new and improved high pressure centrifugal pump.

Another object of this invention is to provide a new and improved high pressure centrifugal pump in which the outer casing can deflect freely relative to the inner casing without exerting undue forces on the bearings and the shaft.

Another object of this invention is to provide a new and improved high pressure centrifugal pump which is lighter and smaller than similar prior art centrifugal pumps.

Objects and advantages other than those set forth above will be apparent from the following description when read in connection with the accompanying drawings in which:

Fig. 1 is a section view of the pump of this invention; and

Fig. 2 is an exaggerated view of the outer casing being deflected by the fluid pressure within the pump.

A single stage centrifugal pump 10 embodying this invention is illustrated in Fig. 1. This invention has particular advantages when incorporated in pumps designed to run at speeds in excess of 11,000 R. P. M. and operate under pressures in excess of 4,000 pounds per square inch. The pump 10 comprises an inner casing 11 and an outer casing 12. The inner casing 11 defines an impeller chamber 13 having inlet and discharge passages 14, 15. An impeller shown as a double suction impeller 14 is mounted on a rotatable shaft 20 and positioned within the impeller chamber 13. The suction 21 and discharge 22 sides of the impeller 19 are in proper alignment with the inlet 14 and discharge 15 passages in the inner casing 11.

The inner casing 11 comprises a shell 25 having a generally cylindrical outer surface 26 and a partially threaded open end 27, an end plate 28 which fits into the open end 27 of the shell 25 and abuts a shoulder 29 and an externally threaded ring 31 which operatively engages the threaded portion 30 of the open end of the shell 25 and abuts the end plate 28. The end plate 28 and the closed end 32 of the shell 25 are provided with generally cylindrical centrally located axially extending members 34, 35, respectively. These members 34, 35 extend outwardly from the inner casing 11 and form mountings on which outer casing 12 is positioned. The members 34, 35 define axial bores 35, 36 in which bearing means 37, 38 are mounted for receiving the rotatable shaft 20.

The outer casing 12 is divided into a barrel portion 41 which is open at one end and slides over the inner casing 11 and a cover plate 47 which fits into the open end 43 of the barrel 41. The barrel portion presents a generally cylindrical internal surface 44 and has an internal shoulder 45 spaced inwardly from its open end 43. The surface 47 between the open end of the barrel 41 and the shoulder 45 is threaded. The cover plate 42 fits into the open end of the barrel 41 and abuts the shoulder 45. An externally threaded annular member 48 operatively engages the threaded portion 47 of the barrel 41 and abuts the end plate 42 to complete the assembly of the unit. The outer casing 12 defines inlet 51 and discharge 52 passages which are in alignment with the inlet 14 and discharge 15 passages in the inner casing 11. Pegs 53 are positioned in the outer casing 12 and extend into the inner casing 11 to align the inlet and discharge passages in the inner and outer casings and prevent relative rotation of the inner and outer casings.

Suitable sealing means such as O-rings 56 are positioned in the space between the inner and outer casings to prevent leakage of fluid from the high pressure areas such as in the discharge passages 15, 52 to the low pressure areas such as in the inlet passages 14, 51.

The ends of the outer casing 12, namely, the closed end of the barrel 41 and the cover plate 42 are provided with surfaces 59, 60, respectively, that define apertures 61, 62 of varying diameters. The apertures 63, 64 are concentric with the shaft 20 and fit over the members 33, 34 on the inner casing 11 to position the outer casing 12 on the inner casing. The inner portions 61, 62 of the surfaces 59, 60 define apertures having smaller diameters than the corresponding outer diameters 63, 64 of the apertures. The surfaces 59, 60 may be tapered slightly as they extend from the inside of the outer casing to the outside of the casing to form a frusto conical shaped aperture.

However, in the preferred embodiment as illustrated in the drawings, there is a small area or projection 66 near the inboard end of the surfaces 59, 60 which defines an aperture having a smaller diameter than the rest of the aperture. The outer casing 12 is positioned on the extension members 33, 34 of the inner casing at only the projections 66 of the surfaces 59, 60 so that the outer casing is in contact with the inner casing at only two points. The ends of the outer casing are then free to pivot relative to the inner casing around their points of contact with the inner casing.

When the pump 10 is operating, the fluid under pressure within the pump 10 exerts a force on the outer casing 12 which may in some applications approach the yield point of the metal in the casting. This force tends to deflect the end of the outer casing such as illustrated in Fig. 2.

The outer casing usually deflects in a nonuniform rate because of the imperfections in the casting which forms the outer casing and because of the pressure relief channel 69 in the outer casing 12. In other words, all parts of the outer casing will not resist bending due to the force of the liquid within the pump at the same rate. Therefore, some portions of the outer casing will bend or move farther than other sections of the casing. If the outward deflection of the ends of the outer casing 12 is not uniform, the ends of the outer casing will pivot around their point of contact with the inner casing. Since the surfaces 60, 59 in the outer casing have radial inwardly extending projections 66 positioned on the extension members 33, 34, the ends of the outer casing are free to pivot in any direction relative to the inner casing 11 within the limits provided by the projections 66 without exerting any undue force on the inner casing 11 which can be transmitted to the bearing means 37, 38 and the shaft 20. The broken lines in Fig. 2 indicate the pumps outer casing 12 in its undeflected position and the solid lines show the outer casing 12' in a deflected position. As shown in Fig. 2, the end of the outer casing has pivoted relative to the inner casing around the point at which it is in contact with the extension members 34, 35 of the inner casing.

In assembly of the pump 10 the bearing means 37 is positioned in the axially extending bore of extension member 33 of the shell portion 25. The double suction single stage impeller 19 is then positioned on the shaft 20. Shaft sleeves 72 and brushings 73 are then fitted over the shaft 20 and fluid thrust bearings 75 are fitted within the shell portion 25, and the end plate 28 of the inner casing 11. The shaft 20 and impeller 19 are then slid into the shell portion 25 with the end of the shaft journaled in the bearing means 37. The bearing means 38 is positioned in the bore of extension member 34 and the end plate 28 is then slid over the shaft 20 and positioned within the open end of the shell 25. The ring 31 is then operatively engaged in the threaded portion 29 of the shell portion 25 to complete the assembly of the inner casing 11. Suitable O rings 56 are positioned around the periphery of the inner casing 11 and the barrel portion 41 of the outer casing 12 is slid over the inner casing and positioned relative to the inner casing by the pegs 53. The cover plate 42 is then fitted into an abutting position against the shoulder 45 in the open end 43 of the barrel. The annular member 48 is then threaddedly engaged with the threaded portion of the barrel 41 until it forces the cover plate 42 into sealing relation with the barrel to complete assembly of the pump 11.

Although but one embodiment has been shown and described, it will be apparent to those skilled in the art that various changes and modifications may be made therein without departing from the spirit of the invention or from the scope of the appended claims.

What is claimed is:

1. A centrifugal pump comprising an inner casing defining an impeller chamber and inlet and discharge passages, said casing having a centrally located axially extending member at either end, said members defining a bore, a shaft rotatably mounted in said bore, an impeller mounted on said shaft and positioned within said impeller chamber in proper alignment with said inlet and said discharge passages, an outer casing surrounding said inner casing, said outer casing having inlet and discharge passages cooperating with said inlet and discharge passages in said inner casing, the ends of said outer casing having surfaces defining axially aligned apertures of varying diameter for receiving said members, said surfaces being in contact with said members at only one point adjacent the inboard side of said ends, said surfaces being in contact with said members at the portion of said surfaces defining the smallest portion of said apertures, whereby the ends of said outer casing are free to deflect relative to said inner casing and said members due to the internal pressure in said pump.

2. A centrifugal pump comprising an inner casing, said inner casing defining an impeller chamber and inlet and discharge passages, said inner casing having an axially extending member at either end, said members defining a bore, bearing means mounted in said bores, a shaft journaled in said bearing means, an impeller mounted on said shaft and positioned in said impeller chamber in proper alignment with said inlet and discharge passages, an outer casing surrounding said inner casing and having surfaces defining variable diameter axially aligned apertures at either end, said outer casing being in contact with said inner casing only at the point in said surfaces defining the smallest diameter of said apertures, whereby the ends of said outer casing are free to pivot around said points of contact and deflect relative to said inner casing due to the internal pressure in said pump.

3. A centrifugal pump comprising an inner casing defining an impeller chamber and inlet and discharge passages, said inner casing having a centrally located axially extending member at either end, each of said members defining a bore, bearing means mounted in said bore, a shaft rotatably mounted in said bearing means, an impeller mounted on said shaft and positioned in said impeller chamber in proper alignment with said inlet and discharge passages, an outer casing positioned over said inner casing, said outer casing having inlet and discharge passages cooperating with said inlet and discharge passages in said inner casing, said outer casing having surfaces defining axially aligned frusto-conical apertures at either end, the inboard end of said surfaces defining the smallest diameter of said apertures, said outer casing being in contact with said members at said inboard ends of said surfaces, whereby said outer casing is free to pivot around said points of contact and deflect relative to said inner casing due to the internal pressure of said pump.

4. A centrifugal pump comprising an inner casing having a shell portion with an open end and an end plate removably mounted in said open end, said shell portion presenting a generally cylindrical external surface and defining within an impeller chamber an inlet and discharge passages, said end plate and said shell portion having outwardly extending axial members, each of said members defining a bore, bearing means mounted in said bores, a shaft rotatably mounted in said bearing means, an impeller mounted on said shaft and positioned within said impeller chamber, an outer casing having a barrel portion open at one end and a cover plate removably mounted in said open end of said barrel portion, said barrel portion presenting a generally cylindrical internal surface surrounding said inner casing and defining therebetween an annular space, said barrel portion defining inlet and discharge passages cooperating with said inlet and discharge passages in said shell portion, means mounted in said casings to maintain said inlet and discharge passages in alignment, sealing means positioned between said barrel portions and said shell portions to prevent leakage of fluid between said inlet and discharge passages, said barrel portion and said cover plate having surfaces defining variable diameter axially aligned apertures concentric with said shaft, the inboard ends of said surfaces defining the smallest diameter of said apertures, said barrel portion and said cover plate being in contact with said outwardly extending axial members at the inboard ends of said surfaces whereby the closed end of said barrel portion and said cover plate are free to pivot around said points of contact and deflect relative to said members due to the internal pressure in said pump.

References Cited in the file of this patent
UNITED STATES PATENTS

| | | |
|---|---|---|
| 2,374,122 | Nelson | Apr. 17, 1945 |
| 2,408,637 | Hart | Oct. 1, 1946 |
| 2,661,698 | Schellens | Dec. 8, 1953 |
| 2,668,501 | Lutz | Feb. 4, 1954 |
| 2,678,606 | Watson | May 18, 1954 |